June 27, 1967    KOJI HOTTA    3,327,637
TRANSMISSION GEAR ARRANGEMENT FOR A ROTARY
MACHINE OPERABLE AS PUMP OR FLUID MOTOR
Filed March 17, 1965    3 Sheets-Sheet 1

INVENTOR.
Koji Hotta
BY
Michael J. Striker
Atty.

United States Patent Office 3,327,637
Patented June 27, 1967

3,327,637
TRANSMISSION GEAR ARRANGEMENT FOR A ROTARY MACHINE OPERABLE AS PUMP OR FLUID MOTOR
Koji Hotta, Shinagawa-ku, Tokyo, Japan, assignor to Oval Gear Engineering Co., Ltd., Tokyo, Japan
Filed Mar. 17, 1965, Ser. No. 440,473
6 Claims. (Cl. 103—126)

The present invention relates to a gearing device which can turn in regular rotation to a regular rotation and vice versa.

The one object of the present invention is to provide a gearing device which can regulate irregular rotary velocity given by or taken from those mechanisms such as a displacement flow meter, hydrodynamic motor, and the like in which a pair of oval wheels are provided as rotors thereof, and which can transmit the rotary velocity regulated thereby to metering members provided or attached thereto.

Another object of the present invention is to provide a gearing device which can turn a regular rotary velocity of the input of a rotary pump in which a pair of oval wheels are provided, to an irregular rotary movement working therein.

It is common that those mechanisms such as a displacement flow meter, rotary pump and the like which utilize oval wheels for rotating members, are run under irregular rotary velocities so as to make their oval wheels, viz, rotors thereof perform constant areal displacements. However, such irregular operations of the mechanisms unavoidably cause inconvenience that an angular acceleration is apt to take place therein, resulting in making the flow passing therethrough irregular and subsequently making their metering functions inaccurate. When said mechanisms is used as a hydrodynamic motor, it can hardly be used for various purposes because its output can only give irregular rotary movements. And, in case where it is used as a rotary pump, its rotors, viz, oval wheels have to run with irregular rotary velocities in spite of regular rotary velocities given to the input of mechanisms, resulting in failure of giving a regular amount of the flow to its output.

It is an object of the present invention to overcome these disadvantages of conventional mechanisms which utilize oval wheels for their rotating members. Hence, it may be appreciated that the present invention can provide a gearing device comprising a set of gear wheels having varying radii which are so dimensional as to transform irregular rotary velocities of rotors such as oval wheels into substantially uniform rotary velocities and vice versa in accordance with the purpose for which the mechanism utilizing oval wheels is used.

Figure 1:
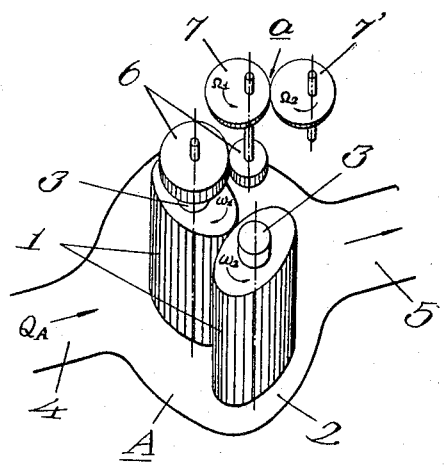

With the above objects and other objects which will be apparent from the following detailed descriptions of the invention, an embodiment of the invention is explained with reference to the accompanying drawings, in which;
FIG. 1 is a perspective view of a gearing arrangement of the present invention connected to a displacement flow meter running with irregular rotary velocities, FIGS. 2 to 3 respectively illustrate different pitch-curvatures of a pair of gear wheels having irregular radii and constituting the gearing device according to the present invention.

Particularly with reference to FIG. 1, a pair of rotary oval wheels 1, 1 are provided in the metering chamber 2 of a flow meter A, and fitted with axles 3, 3. The fluid flowing from an inlet 4 to an outlet 5 rotates the oval wheels 1, 1 by making them gear each other, whereby the amount of fluid passed therethrough can be calculated by reading the rotary velocities of the axles 3, 3. Reduction or multiplying gearing 6 is connected with one of the axles 3, 3 of the oval wheels 1, 1. A gearing device $a$ which comprises a pair of gear wheels having irregular radii, that is, a driving gear wheel 7 and a driven gear wheel 7', is geared directly with one of the axles 3, 3 of the oval wheels 1, 1, or through said reduction or multiplying gearing 6.

In the above constructions, when the number of oval wheels 1, 1 is $n$, though said number being generally 2, the velocity ratio of the reduction or multiplying gear 6 is $\lambda_o$, the velocity ratio of the driving gear wheel 7 of the gearing device $a$ to the driven gear wheel 7' is $\lambda$, and the numbers of said driving and driven gear wheel 7, 7' are $N_1$ and $N_2$, $$N_1 = \frac{n}{\lambda_o} \qquad N_2 = \frac{n}{\lambda_o \lambda} = \frac{N_1}{\lambda}$$

Under the above terms and when the pitch-curvatures of the oval gear wheels 1, 1 are respectively supposed as $\rho_1(\theta_1)$ and $\rho_1(\theta_2)$, their angular velocities $\omega_1$ and $\omega_2$, the pitch-curvatures of the driving gear wheel 7 and the driven gear wheel 7' of the gearing device $a$ as $R_1(\varphi_1)$ and $R_2(\varphi_2)$, and their angular velocities $\Omega_1$ and $\Omega_2$, the following equations are set up.

(1) Terms for rolling contact therebetween:

$$\left.\begin{array}{l} R_1 + R_2 = C\,(=\text{const}) \\ R_1 d\varphi_1 = R_2 d\varphi_2 \end{array}\right\} \qquad \text{(I)}$$

(2) Relations between angular velocities thereof:

$$\left.\begin{array}{l} \Omega_1 = \lambda_o \omega_1 \quad \therefore d\varphi_1 = \lambda_o d\theta_1 \\ \Omega_2 = \text{const} \end{array}\right\} \qquad \text{(II)}$$

When the areal displacement value of the flow is $Q_A$, and major axes of the oval wheel is $\rho_L$, the areal displacement velocity $dQ_A/dt$ is given by the following equation.

$$\frac{dQ_A}{dt} = \tfrac{1}{2}(\rho_L{}^2 - \rho_1{}^2)\frac{dQ_1}{dt} + \tfrac{1}{2}(\rho_L{}^2 - \rho_2{}^2)\frac{d\theta_2}{dt} = \text{const} = C_A \tag{III}$$

When $\rho_1 + \rho_2 = K$, the above equation is transformed to the following.

$$2\frac{dQ_A}{d\theta_1} = \rho_L{}^2\left(1 + \frac{\rho_1}{K - \rho_1}\right) - K\rho_1$$

And, $$C_A = \frac{dQ_A}{dt} = \frac{dQ_A}{d\theta_1} \cdot \frac{d\theta_1}{d\varphi_2} \cdot \frac{d\varphi_2}{dt}$$

Hence, $$\frac{d\varphi_2}{d\theta_1} = \frac{1}{C_A} \cdot \frac{dQ_A}{d\theta_1} \cdot \frac{d\varphi_2}{dt} = \frac{1}{C_A} \cdot \frac{dQ_A}{d\theta_1} \cdot \Omega_2 = \frac{\Omega_2}{2C_A}\left\{\rho_L{}^2\left(1 + \frac{\rho_1}{K - \rho_1}\right) - K\rho_1\right\} \tag{IV}$$

Whereas, the value of $C_A$ is given by the following equation, when the areal displacement value of the flow which a pair of said oval wheels force out after they make a single revolution, viz, the theoretical areal displacement value thereof is $q_A$.

$$C_A = \frac{\Omega_2}{2\pi} \cdot \frac{1}{\lambda_o \lambda} q_A \tag{V}$$

Therefore, the following equations are obtainable.

$$\frac{d\varphi_2}{d\theta_1} = \frac{\pi}{q_A}\lambda_o\lambda\left\{\rho_L{}^2\left(1 + \frac{\rho_1}{K - \rho_1}\right) - K\rho_1\right\} \tag{VI}$$

$$\therefore \varphi_2 = \frac{\pi}{q_A}\lambda_o\lambda\int\left\{\rho_L{}^2\left(1 + \frac{\rho_1}{K - \rho_1}\right) - K\rho_1\right\}d\theta_1 \tag{VII}$$

Hence, the pitch-curvatures of the driving gear wheel 7 and the driven gear wheel 7' which constitute the gearing device $a$ are found as follows in view of the aforementioned terms for rolling contact therebetween, $$R_1 = \frac{C}{1 + \dfrac{d\varphi_1}{d\varphi_2}} = \frac{C}{1 + \lambda_o\dfrac{d\theta_1}{d\varphi_2}}, \quad \varphi_1 = \lambda_o \theta_1 \tag{VIII}$$

$$R_2 = \frac{C}{1+\dfrac{d\varphi_2}{d\varphi_1}} = \frac{C}{1+\dfrac{1}{\lambda_o}\dfrac{d\varphi_2}{d\theta_1}}$$

$$\varphi_2 = \frac{\pi \lambda_o \lambda}{q_A} \int \left\{ \rho_L{}^2 \left(1+\frac{\rho_1}{K-\rho_1}\right) - K\rho_1 \right\} d\theta_1 \quad \text{(IX)}$$

wherein $$\frac{d\varphi_2}{d\theta_1} = \frac{\pi \lambda_o \lambda}{q_A}\left\{\rho_L{}^2\left(1+\frac{\rho_1}{K-\rho_1}\right) - K\rho_1\right\} \quad \text{(X)}$$

When $\lambda_o = \lambda = 1$, that is, $$\left[\frac{d\varphi_2}{d\theta_1}\right]_{\lambda=1} = \frac{\pi}{q_A}\left\{\rho_L{}^2\left(1+\frac{\rho_1}{K-\rho_1}\right) - K\rho_1\right\}$$

$$[\varphi_2]_{\lambda=1} = \frac{\pi}{q_A}\int\left\{\rho_L{}^2\left(1+\frac{\rho_1}{K-\rho_1}\right) - K\rho_1\right\}d\theta_1 \quad \text{(XI)}$$

The Equations VIII and IX can be transformed as follows.

$$R_1 = \frac{C}{1+\dfrac{1}{\lambda}\left[\dfrac{d\theta_1}{d\varphi_2}\right]_{\lambda=1}}, \quad \varphi_1 = \lambda_o \theta_1 \quad \text{(VIII)}'$$

$$R_2 = \frac{C}{1+\dfrac{1}{\lambda}\left[\dfrac{d\varphi_2}{d\theta_1}\right]_{\lambda=1}}, \quad \rho_2 = \lambda_o \lambda [\varphi_2]_{\lambda=1} \quad \text{(IX)}'$$

Thus, the gearing mechanism $a$ comprising the driving and driven gear wheels 7 and 7' provided with irregular radii which can turn the output rotary velocity of those displacement flow meters which are provided with the oval gear wheels 1, 1, to regular rotary movements, is obtainable.

Figure 2:
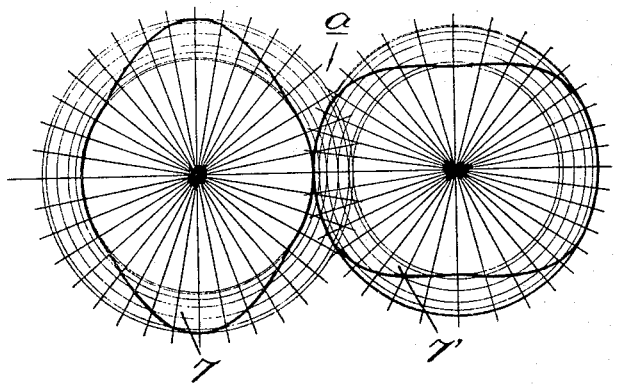

In a typical embodiment taken on such polar coordinates as illustrated in FIG. 2, the pitch-curvatures of the driving and driven gear wheels 7 and 7' of a flow meter provided with a pair of oval gear wheels 1, 1 having the curvatures $$\rho = \frac{a}{1 \pm b \cos 2\theta} \quad \text{(XII)}$$

and respectively given by the following equations.

$$\left[\frac{d\varphi_2}{d\theta_1}\right]_{\lambda=1} = \frac{(1+b)}{2\{(1+b)^2 - \sqrt{1-b^2}\}}$$

$$\left\{(1+b)\left(1+\frac{1-b^2}{1\pm 2\cos 2\theta + b_2}\right) - \frac{2(1-b)}{1 \pm b \cos 2\theta}\right\}$$

$$\varphi_{2\lambda=1} = \frac{(1+b)^2}{2\{(1+b)^2 - \sqrt{1-b^2}\}}\left\{\theta + \tan^{-1}\frac{1\mp b}{1\pm b}\tan\theta\right\} \quad \text{(XIII)}$$

$$-\frac{2}{(1+b)\sqrt{1+b}}\sqrt{1-b}\tan^{-1}\frac{\sqrt{1\mp b}}{\sqrt{1\pm b}}\tan\theta \quad \text{(XIV)}$$

A various kind of gearing device comprising a pair of driving and driven gear wheels 7 and 7' such as illustrated in FIGS. 2 to 6, as embodiments of the invention, are obtainable, when suitable values are given in place of $\lambda_o$ and $\lambda$ in the above Equations VIII and XIV, so that an output rotation having constant angular velocities may be obtained from the driven gear wheels 7'.

Figure 3:
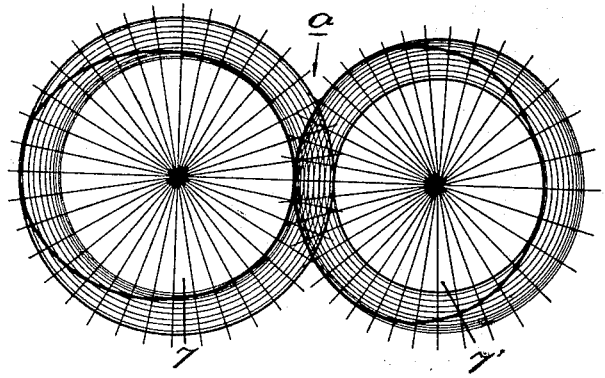
Figure 4:
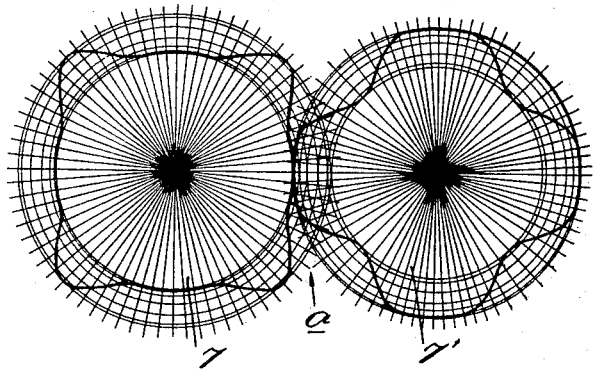
Figure 5:
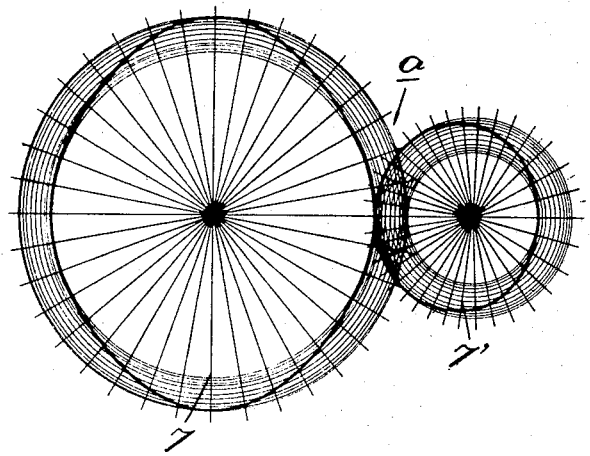
Figure 6:
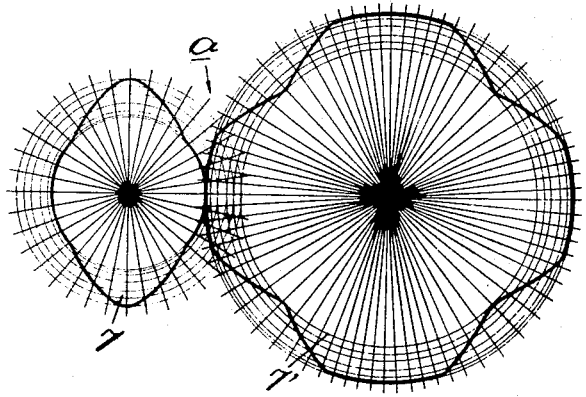

In FIG. 2 a pair of the driving and driven gear wheels 7 and 7' are illustrated when $\lambda_o=1$ and $\lambda=1$ are given in the above Equations XIII and XIV, similarly in FIG. 3 $\lambda_o=2$ and $\lambda=1$, in FIG. 4 $\lambda_o=\frac{1}{2}$ and $\lambda=1$, in FIG. 5 $\lambda_o=\lambda=2$, and in FIG. 6 $\lambda_o=1$ and $\lambda=\frac{1}{2}$. Other modifications of the driving and driven gear wheels 7 and 7' may be obtained by changing the values of said $\lambda_o$ and $\lambda$.

While the invention has been explained particularly with reference to an embodiment provided to a displacement flow meter, the principle of the present invention is similarly applicable to a hydrodynamic motor as well as a rotary pump in which a regular rotary velocity is given to a driven gear wheel of the present invention gearing device $a$, so that irregular rotary velocities of oval wheels may be obtained.

The gearing device of the present invention having the above characteristic features can efficiently achieve the aforementioned objects.

What is claimed:
1. In a rotary machine operable as pump and fluid motor, in combination, a housing having an inlet, an outlet and an inner peripheral surface; a pair of oval wheels having each an outer peripheral surface and being arranged in said housing rotatable about the axes thereof, the peripheral surfaces of said wheels and the axes thereof being constructed and arranged with respect to each other and said inner peripheral surface of said housing so that during rotation of said wheels the peripheral surfaces thereof will be in constant contact with each other and said inner peripheral surface of said housing; and transmission gear means including at least two gears of varying radii, one of said two gears being connected to one of said oval wheels for rotation therewith and the other being in constant mesh with said one gear, said varying radii of said two gears being constructed so that when the machine is operated as pump driven by said other gear while the latter is rotated with a constant angular velocity, said oval wheels will be rotated with a rhythmically changing angular velocity to displace during rotation thereof a substantially constant volume of fluid, and so that during operation of the machine motor, said other gear will be rotated with an angular velocity independent from the rhythmically changing rotation of said oval wheels and depending only on the volume of fluid passing through the machine.

2. In a rotary machine as claimed in claim 1, wherein said gear means include a reduction gearing between said one of said oval wheels and said one of said two gears.

3. In a rotary machine as claimed in claim 2, in which said two gears are respectively provided with the pitch-curvatures represented by the following equations.

$$R_1 = \frac{C}{1+\lambda_o\dfrac{d\theta_1}{d\varphi_2}}, \quad \varphi_1 = \lambda_o \theta_1$$

$$R_2 = \frac{C}{1+\dfrac{1}{\lambda_o}\dfrac{d\theta_2}{d\theta_1}}, \quad \varphi_2 = \frac{\pi \lambda_o \lambda}{q_A}\int\left\{\rho_L{}^2\left(1+\frac{\rho_1}{K-\rho_1}\right) - K\rho_1\right\}d\theta_1$$

wherein $\rho_L$ represents the major axes of the oval wheels, $\rho_1(\theta_1)$ and $\rho_2(\theta_2)$ respectively the radii of curvatures thereof, $\omega_1$ and $\omega_2$ angular velocities thereof, $R_1(\varphi_1)$ and $R_2(\varphi_2)$ respectively the pitch radii of said two gears, $\lambda_o$ the velocity ratio of the reduction gearing, and $\lambda$ the velocity ratio between two gears.

4. In a rotary machine as claimed in claim 2, wherein the oval wheels form part of a rotary pump.

5. In a rotary machine as claimed in claim 1, wherein the oval wheels form part of a displacement flow meter.

6. In a rotary machine as claimed in claim 1, wherein the oval wheels form part of a hydrodynamic motor.

References Cited

UNITED STATES PATENTS

| | | | |
|---|---|---|---|
| 2,439,427 | 4/1948 | Guibert et al. | 74—437 |
| 2,861,635 | 11/1958 | Orr | 74—437 X |
| 2,897,765 | 8/1959 | Kitano | 74—437 X |

DONLEY J. STOCKING, *Primary Examiner.*

DAVID J. WILLIAMOWSKY, *Examiner.*

L. H. GERIN, *Assistant Examiner.*